United States Patent Office 2,856,325
Patented Oct. 14, 1958

2,856,325

FUNGICIDAL COMPOSITIONS

Carleton B. Scott, Pomona, and John W. Yale, Jr., Yorba Linda, Calif., assignors, by mesne assignments, to Collier Carbon and Chemical Corporation, a corporation of California No Drawing. Application February 10, 1956
Serial No. 564,639

9 Claims. (Cl. 167—22)

This invention relates to fungicidal compositions, and in particular concerns compositions of such character in which an organo-phosphorus polymer is employed as the essential active ingredient.

In copending application, Serial No. 518,390, filed June 27, 1955, there is described a class of polymeric materials obtained by reaction between an alkylene oxide or sulfide with a lower alkyl trithiometaphosphate. These materials vary in physical form from viscous liquids to rubber-like or resinous solids, and are disclosed to be useful as lubricant additives, extenders and plasticizing agents for synethetic resins, etc. The present invention is based on our discovery that these polymeric materials are highly toxic to a variety of fungus organisms, and may be formulated with conventional toxicant adjuvants to form a variety of fungicidal compositions useful as sprays, impregnants, dusts, and the like. By reason of their polymeric nature these products have very low volatilities (and hence do not readily evaporate when used in the open air) and are stable to hydrolysis.

As stated, the active ingredient of the present compositions is formed by reaction between a lower alkyl trithiometaphosphate, i. e., a compound of the formula RSPS$_2$ wherein R represents an alkyl group containing from 1 to 4 carbon atoms, and an alkylene oxide or sulfide. The latter reactants may be defined by the formula

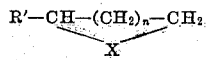

wherein R' represents hydrogen, aryl or alkyl, $n$ represents a whole number less than 2, and X represents oxygen or sulfur. Examples of such compounds include ethylene oxide, proplyene oxide, trimethylene oxide, styrene oxide, ethylene sulfide, n-butyl-ethylene sulfide, propylene sulfide, p-methylstyrene sulfide, etc. The trithiometaphosphate reactant is exemplified by methyl, ethyl, propyl and butyl trithiometaphosphates. The two reactants are preferably employed in substantially equimolecular proportions, although if desired an excess of the oxide or sulfide reactant may be employed to insure complete consumption of the trithiometaphosphate. The reaction takes place exothermically upon mere admixture of the reactants, and when preparing any sizeable quantity of the polymer material the reaction vessel should be equipped with cooling coils or other means for dissipating the exothermic heat of reaction. The use of an inert liquid reaction medium, e. g., benzene, diethyl ether, toluene, etc., is also of assistance in absorbing the heat of reaction, and the use of such a medium constitutes a preferred mode of operation. The reaction is usually carried out at atmospheric pressure with the reaction temperature being maintained below the atmospheric boiling point of the lowest boiling component of the reaction mixture, although higher reaction temperatures and superatmospheric pressure may be employed if desired. In the interests of simplifying the problem of heat dissipation, the reaction temperature is preferably maintained below about 200° C. Upon completion of the reaction, the product is purified by evaporating or distilling off the reaction medium and any unreacted oxide or sulfide reactant. The reaction products themselves are very high-boiling and are distillable only under very high vacuum; accordingly, they are usually employed without further purification. In some cases they may be subjected to extraction with an organic solvent.

The following example is illustrative of the manner in which the members of the present class of fungicidal agents may be prepared, but is not to be construed as limiting the invention:

Example 1

Approximately 42.6 parts by weight of methyl trithiometaphosphate are dissolved in about 36 parts by weight of diethyl ether and placed in a reaction vessel equipped with a reflux condenser and an efficient stirring device. Approximately 17.4 parts by weight of 1,2-propylene oxide are added gradually over a period of 15 minutes, during which time the temperature increases to about 36° C. The diethyl ether is then distilled off, leaving the polymeric product as a very viscous light-tan liquid. Chemical analysis shows this material to correspond closely to the empirical formula C$_4$H$_9$POS$_3$ and to have a molecular weight of about 1900. A similar product, taking the form of a rubber-like solid is obtained when ethylene oxide is substituted for the propylene oxide.

The fungicidal and bacterial compositions of the present invention are prepared by combining one or a mixture of the products obtained as described above with a liquid or solid inert carrier material in the conventional manner. Thus, the polymeric reaction product may be dispersed in water with the aid of a dispersing agent to form a concentrate composition which is subsequently diluted with water to form a spray suitable for application to living plants, lumber, and other materials subject to fungus and bacteria attack. Alternatively the polymeric product may be admixed with an inert solid diluent such as talc, starch, diatomaceous earth, aluminum silicate, etc. to form a dusting composition which can be employed as such or dispersed in an aqueous or oleaginous medium to form a spray. In general, any of the conventional formulation and application techniques may be employed in employing the present fungicidal and bactericidal products, and any of the various known wetting agents, spreaders, sticking agents, diluents, etc. may be employed in combination with any of such products. The latter are substantially nonphytotoxic and may be applied to living plants in relatively high concentrations. However, as will be apparent from the test data presented below, they are effective in very small quantities, and in the interests of economy they are usually applied at concentrations of the order of 50–2000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrate compositions usually contain between about 5 and about 25 percent by weight of the active ingredient and, optionally, small amounts of spreading agents and other conventional adjuvants.

The following examples will illustrate the formulation of a number of fungicidal compositions comprising members of the present class of products as the primary toxic agent, but are not to be construed as limiting the invention:

Example II

|  | Lbs. |
|---|---|
| Reaction product as prepared in Example I | 2.0 |
| Attapulgus clay | 2.5 |
| Aluminum silicate | 40.0 |
| Powdered blood albumen | 0.2 |

Example III

|  | Lbs. |
|---|---|
| Methyl trithiometaphosphate-ethylene oxide | 2.5 |
| Water | 50.0 |
| Sodium oleate | 0.5 |

The reaction product and sodium oleate are added to the water, and the mixture is then passed through a colloid mill or high speed blender to obtain a concentrate composition which can be diluted 1000:1 with water to obtain a fungicidal spray for application to living plants.

Example V

|  | Lbs. |
|---|---|
| Ethyl trithiometaphosphate-styrene oxide | 10.0 |
| Petroleum sulfonate | 0.1 |
| Kerosene extract oil | 150.0 |

This composition is suitable for impregnating lumber.

Example VI

|  | Lbs. |
|---|---|
| Iso-butyl trithiometaphosphate-iso-butylethylene sulfide | 10.0 |
| Water | 50.0 |
| Commercial spreading agent | 0.5 |
| Commercial sticking agent | 0.5 |

The ingredients are mixed in a ball mill and thereafter diluted with 1200 gallons of water to obtain a spray composition containing about 1000 parts per million of the active ingredient.

Example VII

|  | Lbs. |
|---|---|
| Methyl trithiometaphosphate ethyl-ethylene oxide | 4.0 |
| Aluminum silicate | 1000.0 |
| Diatomaceous earth | 500.0 |
| Lime arsenate | 100.0 |

This composition is suitable for direct application as an insecticidal and fungicidal dust.

In order to demonstrate the fungicidal activity of the present products, the following test procedure is employed: A 25-gram sample of the material to be tested and 2 drops of a non-ionic dispersing agent ("Triton X-171" manufactured by Rohm and Haas Co.) is added to enough distilled water to make 100 grams and the solution is homogenized for 3 minutes in a high-speed blender. With the blender operating, 3 grams of the liquid are removed and stirred into 75 grams of potato dextrose agar at 45° C., and the agar is transferred to a Petri dish. The agar so prepared contains 1000 p. p. m. of the material to be tested. If lower concentrations are to be tested, e. g., 10 or 100 p. p. m., 1-gram portions of the concentrate composition in the blender are diluted with water accordingly. The agar is allowed to cool to room temperature, whereupon it solidifies, and a ¼" disc of the test fungus inoculum is placed on the surface of the agar. The inoculated agar is incubated for two days, after which the extent of fungus growth is measured and the percent inhibition of fungus growth is calculated by the formula:

$$100 - \frac{\text{Growth on test sample} \times 100}{\text{Growth on blank}}$$

The following tabulation presents inhibition values typical of those obtained by subjecting the present polymeric reaction products to the foregoing test procedure employing a variety of test organisms. The particular reaction product employed was the methyl trithiometaphosphate-propylene oxide polymer prepared as described in Example I, and at a concentration of 1000 p. p. m.

| Test organism: | Percent inhibition of growth |
|---|---|
| R. solani | 98.9 |
| S. rolfsii | 98.1 |
| P. cinnamoni | 100.0 |
| P. ultimum | 100.0 |
| S. sclerotiorum | 96.0 |
| S. fructicola | 97.1 |
| B. cinerea | 98.5 |
| A. solani | 100.0 |
| Average for all organisms | 98.6 |

The following results were obtained on several well-known commercial fungicides:

| Fungicide: | Percent inhibition of growth at 1000 p. p. m. average for eight organisms |
|---|---|
| "Captan" | 90 |
| "PCNB" | 91 |
| "Phygon" | 83 |
| "Fermate" | 96 |

In addition to their fungicidal properties, the present reaction products are toxic to bacteria; at a concentration of 1000 p. p. m. the product of Example I completely inhibited the growth of *Erwinia carotovora*, *Aerobacterium tumefaciens*, and *Xanthomonos juglandis*.

Other modes of applying the principle of our invention may be employed instead of those explained, change being made as regards the methods or materials employed, provided the step or composition stated by any of the following claims, or the equivalent of such stated steps or composition, be employed or obtained.

We, therefore, particularly point out and distinctly claim as our invention:

1. A fungicidal composition comprising (1) the product of reaction between a lower alkali trithiometaphosphate of the formula RSPS$_2$ wherein R represents an alkyl group containing from 1 to 4 carbon atoms and a compound of the general formula

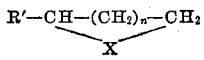

wherein R' represents a substituent selected from the class consisting of the hydrogen atom and lower alkyl and phenyl radicals, n represents a number of the group 0 and 1, and X represents a divalent element selected from the class consisting of oxygen and sulfur, and (2) a carrier therefor, said reaction product being the essential active ingredient of said composition.

2. A composition as defined by claim 1 wherein the said carrier comprises water and sufficient of a dispersing agent to maintain the said active ingredient dispersed in said water.

3. A composition as defined by claim 2 containing between about 50 and about 2000 parts per million of the said active ingredient.

4. A fungicidal composition comprising (1) the product obtained by reacting an alkyl trithiometaphosphate of the general formula RSPS$_2$, wherein R represents an alkyl group containing from 1 to 4 carbon atoms, with an alkylene oxide of the general formula

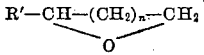

wherein R' represents a substituent selected from the class consisting of the hydrogen atom and lower alkyl and phenyl radicals and n represents a number of the group 0 and 1, at a reaction temperature below about 200° C., and (2) a carrier therefor, said product being the essential active ingredient of said composition.

5. A composition as defined by claim 4 wherein the said alkyl trithiometaphosphate is methyl trithiometaphosphate.

6. A composition as defined by claim 4 wherein the said alkylene oxide is propylene oxide.

7. A composition as defined by claim 4 wherein the said carrier comprises water and sufficient of a dispersing agent to maintain the said active ingredient dispersed in said water.

8. A fungicidal composition comprising (1) the product obtained by reacting an alkyl trithiometaphosphate of the general formula $RSPS_2$, wherein R represents an alkyl group containing from 1 to 4 carbon atoms, with an alkylene sulfide of the general formula

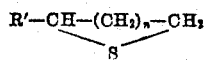

wherein R' represents a substituent selected from the class consisting of the hydrogen atom and lower alkyl and phenyl radicals and $n$ represents a number of the group 0 and 1, at a reaction temperature below about 200° C., and (2) a carrier therefor, said product being the essential active ingredient of said composition.

9. The method of preventing and controlling the growth of fungi on plant materials which comprises applying thereto an effective amount of the composition defined by claim 1.

No references cited.

UNITED STATES PATENT OFFICE
CERTIFICATE OF CORRECTION

Patent No. 2,856,325　　　　　　　　　　　　　　　　　　October 14, 1958

Carleton B. Scott et al.

It is hereby certified that error appears in the printed specification of the above numbered patent requiring correction and that the said Letters Patent should read as corrected below.

Column 1, line 50, for "proplyene" read -- propylene --; column 2, line 34, for "bacterial" read -- bactericidal --; column 4, line 41, for "alkali" read -- alkyl --.

Signed and sealed this 3rd day of February 1959.

(SEAL)

Attest:

KARL H. AXLINE

Attesting Officer

ROBERT C. WATSON
Commissioner of Patents